(12) United States Patent
Verma et al.

(10) Patent No.: US 7,036,044 B1
(45) Date of Patent: Apr. 25, 2006

(54) IDENTIFYING APPROPRIATE UNDO DURING A FORWARD PASS THROUGH A LOG

(75) Inventors: Surendra Verma, Bellevue, WA (US); Jonathan M. Cargille, Seattle, WA (US); Jacob P. Lacouture, Redmond, WA (US); Brian D. Andrew, Redmond, WA (US); Sameet H. Agarwal, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 630 days.

(21) Appl. No.: 10/295,131

(22) Filed: Nov. 15, 2002

(51) Int. Cl.
*G06F 11/00* (2006.01)
(52) U.S. Cl. ............................ 714/19; 714/16
(58) Field of Classification Search ............... 714/16, 714/17, 19, 20, 15; 707/202
See application file for complete search history.

(56) References Cited

U.S. PATENT DOCUMENTS

| | | | | | |
|---|---|---|---|---|---|
| 5,864,849 | A | * | 1/1999 | Bohannon et al. | 707/8 |
| 5,903,898 | A | * | 5/1999 | Cohen et al. | 707/204 |
| 6,154,847 | A | * | 11/2000 | Schofield et al. | 714/4 |
| 2002/0143733 | A1 | * | 10/2002 | Mukkamalla et al. | 707/1 |

* cited by examiner

Primary Examiner—Dieu-Minh Le
(74) Attorney, Agent, or Firm—Workman Nydegger

(57) ABSTRACT

The location of appropriate undo data necessary for reversing an effect of an operation performed at a computer system is identified during a forward pass through a log. A cycle count can be used to determine if appropriate undo data is stored in an object or is stored in auxiliary storage. If appropriate undo data is stored in an object and the undo data would be potentially lost by processing a redo log entry to modify the contents of the object, the appropriate undo data is copied to auxiliary storage. In some embodiments, a secondary computer system receives log entries from a primary computer system. The secondary computer system can identify undo data necessary to reverse an effect of an operation performed at the secondary computer system from received log entries. Identified undo data can be copied auxiliary storage at the secondary computer system.

41 Claims, 5 Drawing Sheets

IDENTIFYING APPROPRIATE UNDO DURING A FORWARD PASS THROUGH A LOG

This application is related to commonly-assigned, co-pending U.S. Patent Application Ser. No. 09/539,233, now U.S. Pat. No. 6,856,993, filed Mar. 30, 2000, which is entitled "Transactional File System."

BACKGROUND OF THE INVENTION

1. Field of the Invention

The present invention relates to maintaining recovery data for a computer system. More specifically, the present invention relates to systems, methods, and computer program product claims for identifying appropriate undo data from a forward pass through a log.

2. Background and Relevant Art

Computer systems and related technology affect many aspects of society. Indeed, the computers system's ability to process information has transformed the way we live and work. Computer systems now commonly perform a host of tasks (e.g. database management, scheduling and word processing) that prior to the advent of the computer system were typically performed manually. Many tasks performed at a computer system include the manipulation of files or other large objects within transaction stores such as databases and transactional message queing systems. For example, a user can transfer commands to a software component at the computer system (e.g., by using a keyboard or mouse) to cause the computer system to create, delete, or modify a file.

At times, performance of a single task can involve a number of operations. In some cases, these operations may be related, such that it is important that all the related operations be performed together. For example, when transferring funds between bank accounts, it may be desirable to perform a first operation, which reduces (i.e., debits) a value in a first file associated with a first bank account, together with a second operation, which increases (i.e., credits) a value in a second file associated with a second bank account.

Unfortunately, when performing a task involving a number of related operations, there is always some possibility that the task might be interrupted (e.g., a user may halt performance of the task or a computer system fault may occur). This can result in a computer system performing some of the related operations, while other related operations are not performed. When only a portion of related operations are performed, data affected by the related operations is often referred to as being in an "inconsistent state."

In some environments, tasks involving a number of operations may be performed in a distributed system where modules connected to a common network interoperate and communicate between one another in a manner that may be transparent to a user. These modules may perform operations by communicating in the background to transfer user commands, program responses, and data between different computer systems. Due to increased complexity, including the possibility of multiple points of failure, the chance of a distributed system being placed in an inconsistent state can be substantially greater than a stand-alone computer system. Also, due to the background interoperability between modules, a user may be unaware that the distributed system is in an inconsistent state.

Identifying the cause of an inconsistent state often requires a level of technical expertise beyond that of the average user. Further, even if the cause of an inconsistent state is identified, it may require a significant amount of time to transition a computer system out of the inconsistent state (e.g., by entering user commands to reverse the effects of previously performed operations). To reduce the chance that a computer system will have to be transitioned out of an inconsistent state by a user, computer systems are often backed-up (e.g., to tape media), at regular intervals (e.g. once a day, once a week, etc.).

A back-up preserves the state of a computer system as of the time the back-up is performed. If after a successful back-up (e.g., backing-up a system that is known to be in a consistent state), a computer system subsequently transitions into an inconsistent state, the computer system can easily be returned to a consistent state by restoring data from back-up. However, depending on the back-up interval, a significant amount of data may be lost when restoring from back-up. For example, if a back-up is performed every day at 11:00 PM and a computer system transitions into an inconsistent state at 10:00 PM, twenty-three hours of data may be lost if the computer system is restored from the last back-up.

To reduce the loss of data when transitioning out of an inconsistent state, computer systems (both stand-alone and distributed systems) can utilize transactional systems, such as, for example, transactional file systems, transactional databases, or transactional message systems. A transactional system can treat a number of related operations as a single atomic unit (commonly referred to as a "transaction"). That is, either all the related operations are performed or none of the related operations are performed. To help achieve this atomicity, an entry for each related operation and data associated with each operation can be written to a log when the operation is successfully complete. Thus, a log can be utilized to maintain a record of all the data modified by operations that occur between back-up intervals.

When all the related operations associated with a transaction are successfully completed, an entry can be included in a log indicating the transaction was "committed." If data modifications resulting from operations of a committed transaction are subsequently lost (e.g., due to a computer system failure), log entries for the operations can be processed to "redo" the data modifications (commonly referred to as "roll-forward"). On the other hand, when all the related operations associated with a transaction do not complete, an entry can be included in the log indicating the transaction was "aborted." When a transaction is aborted, log entries associated with any operations that were performed can be processed to "undo" resulting data modifications (commonly referred to as a "roll-back"). Thus, a log helps ensure that data can be transitioned out of an inconsistent state with minimal loss of data.

To successfully redo and undo operations, a log must maintain sufficient redo and undo data. For some types of operations, the amount of redo data and undo data can be minimal. For example, redo data and undo data for an object creation operation might include only an object name. On the other hand, for other types of operations, the amount of redo and undo data can be quite large. For example, redo data and/or undo data for an object modification operation or object deletion might include significant portions of the contents of an object.

When a portion of an object is to be modified, the log must store both a pre-modified version of the portion of the object (undo data) and a post-modified version of the portion of the object (redo data). For example, when the first ten bytes of a file are to be modified, the pre-modified version of the first ten bytes may be copied to an undo log entry and the post-modified version of the first ten bytes may be copied to a redo log entry. Thus, for each modification to a file, contents of the film may be copied to a log at least twice.

In a computer system where objects are frequently modified, this can result in a large number of copies being performed. If errors occur during these copies, for example, do to a system fault, a check to determine if correct undo data was written to the log can be performed. Typically, to transition a computer system out of an inconsistent state, the most recent back-up is loaded onto the computer system and subsequently the log is rolled-forward to the desired recovery time. If it is determined that one or more log entries contain incorrect undo data, it may be difficult to transition a computer system out of an inconsistent state during a roll-forward recovery. Thus, a log entry that contains incorrect undo data may need to be corrected during a roll-forward recovery.

Some transactional systems are utilized in an environment where one computer system operates as primary and another computer system acts as a secondary (often referred to as a "hot-spare"). In this environment, the primary may receive user and/or application program commands causing a number of operations to be performed as part of a transaction. The primary also maintains a log with log entries for performed operations. At specified intervals or as a result of some event, log entries from the primary are transferred to the secondary. Thus, as the primary performs operations and log entries are added to the log, these logs entries are eventually transferred to the secondary.

The secondary rolls-forward through these log entries as they are received to continually approach the state of the primary. If at some time the primary suffers from a system fault, functionality can be shifted to the secondary. Shifting functionality can include causing transactions, whether they be new transactions or transactions that were open on the primary at the time of the system fault, to be received at the secondary.

However, due to inevitable delays in receiving log entries at the secondary, the state of the secondary can lag behind the state of the primary. One of these inevitable delays is transmission time. That is, transferring log entries across a network connection will consume some amount of time. Further, as the amount of data in a log entry increases, the transmission time can also increase. Thus, log entries that contain increased amounts of data, such as, for example, redo log entries containing redo data and undo log entries containing undo data, may take longer to transfer than other log entries. If the contents of objects are frequently modified at the primary, this increased transmission time may persist as each modification to the contents of an object causes both a redo entry and an undo entry to be transferred to the secondary.

Any delay in receiving log entries at the secondary can cause a corresponding delay in the secondary's ability to process outstanding transactions. If open transactions are shifted to the secondary at a time when the secondary is lagging the primary, the secondary may be unaware of how to process the transactions. The secondary may be required to postpone processing these open transactions until appropriate log entries associated with the open transactions are received. Delaying the processing of transactions is an inconveniences to users and may result in lost revenue to entities associated with the delayed transactions.

Therefore, systems, methods, and computer program products, for increasing the chances of a roll-forward recovery placing a computer system in an appropriate state would be advantageous. Systems, methods, and computer program products, for transferring undo data between computer systems in a manner that conserves bandwidth would be advantageous.

BRIEF SUMMARY OF THE INVENTION

Methods, systems, and computer program products are described for identifying appropriate undo data on a forward pass through a log.

A forward pass through a log, such as, for example, during a roll-forward recovery, can include processing a number of log entries. Some log entries (hereinafter referred to as "redo log entries") can cause the computer system to reconstruct and/or reapply previously executed user and/or application program commands, such as, for example, creating an object, deleting an object, or modifying the contents of an object. When a previously executed command caused the contents of an object to be modified (e.g., editing a file to overwrite a portion of the existing contents of the file), a corresponding redo log entry may include data that was used by the previously executed command to overwrite the contents of the object (hereinafter referred to as "undo data").

Other log entries (hereinafter referred to as "undo log entries") can cause the computer system to construct and/or apply commands that can reverse the effects of previously executed user commands, executed application program commands, and reconstructed and/or reapplied previously executed commands caused by processing a redo entry. When the effects of a command cause the contents of an object to be modified, a corresponding undo log entry may include a pointer to data that can be used to reverse the effects of the command (hereinafter referred to as "undo data"). For example, undo data can be used to place an object in the state it was in before a modification to the contents of the object occurred (e.g., before the file was edited). Pointers included in undo log entries can point to an auxiliary storage that maintains undo data.

During a forward pass through a log, a redo log entry, which includes redo data associated with an operation that was performed on the contents of a particular object, is identified. This can include identifying a redo log entry that was written to the log as a result of user and/or application program commands causing the operation on the contents of the particular object to be performed. For example, a user-initiated edit command to a word processing file may cause a redo entry, which includes the new contents of the word processing file (the redo data), to be written to a log. During a forward pass through the log, this redo entry can be identified. This can include identifying a redo log entry from the log of a computer system where the particular object is stored.

The location of appropriate undo data necessary to reverse the effects of the operation associated with the redo data is identified. For example, to reverse the effects of a user-initiated edit command to a database object, appropriate undo data may be a copy of a portion of the contents of the database object before the user-initiated edit command was performed. Identifying appropriate undo data can include identifying data stored in the particular object or stored in auxiliary storage. A consistency check can be performed to determine if appropriate undo data is stored in the particular object or stored in auxiliary storage. In some cases, it can be identified that there is no appropriate undo data.

If the location of the appropriate undo data is in the particular object, the appropriate undo data is copied from the particular object to a location referenced in an undo log entry that corresponds the redo log entry. A corresponding undo log entry can be an undo log entry that when processed can cause the computer system to construct and/or apply commands to reverse the effects of the operation that was performed on the contents of the particular object. A location referenced in the undo log entry can be a location in auxiliary storage that is addressed by a pointer included in the undo log entry. Thus, appropriate undo data can be copied from the particular object to auxiliary storage. In some cases, the appropriate undo data is copied before the computer system processes the redo log entry. As a result, the chance of overwriting the appropriate undo data stored in the particular object is significantly reduced.

In some embodiments, a secondary computer system identifies appropriate undo data by moving forward through the log of a primary computer system. The secondary computer system receives a first redo log entry from the log of the primary computer system. The first redo log entry includes first redo data associated with a first operation that was performed on a first portion of an object. The secondary computer system also receives a second redo log entry from the log of the primary computer system. The second redo log entry includes second redo data associated with a second operation that was performed on a second portion of the object.

It is determined if undo data necessary to reverse the effects of the second operation is stored in an auxiliary storage location at the secondary computer system. This determination can be made by comparing a cycle count in the second redo log entry to a cycle count in the secondary auxiliary storage. When it is determined that the secondary auxiliary storage does not contain undo data necessary for reversing the effects of the second operation, data from the first redo log entry is stored in the secondary auxiliary storage as the undo data.

Thus, undo data necessary for reversing the effects of operation performed at the secondary computer system is identified at the secondary computer system from previous redo data includes in the log of the primary computer system. Since undo data can be identified at the secondary computer system, there is little need to separately transfer the undo data across network connections to the secondary computer system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
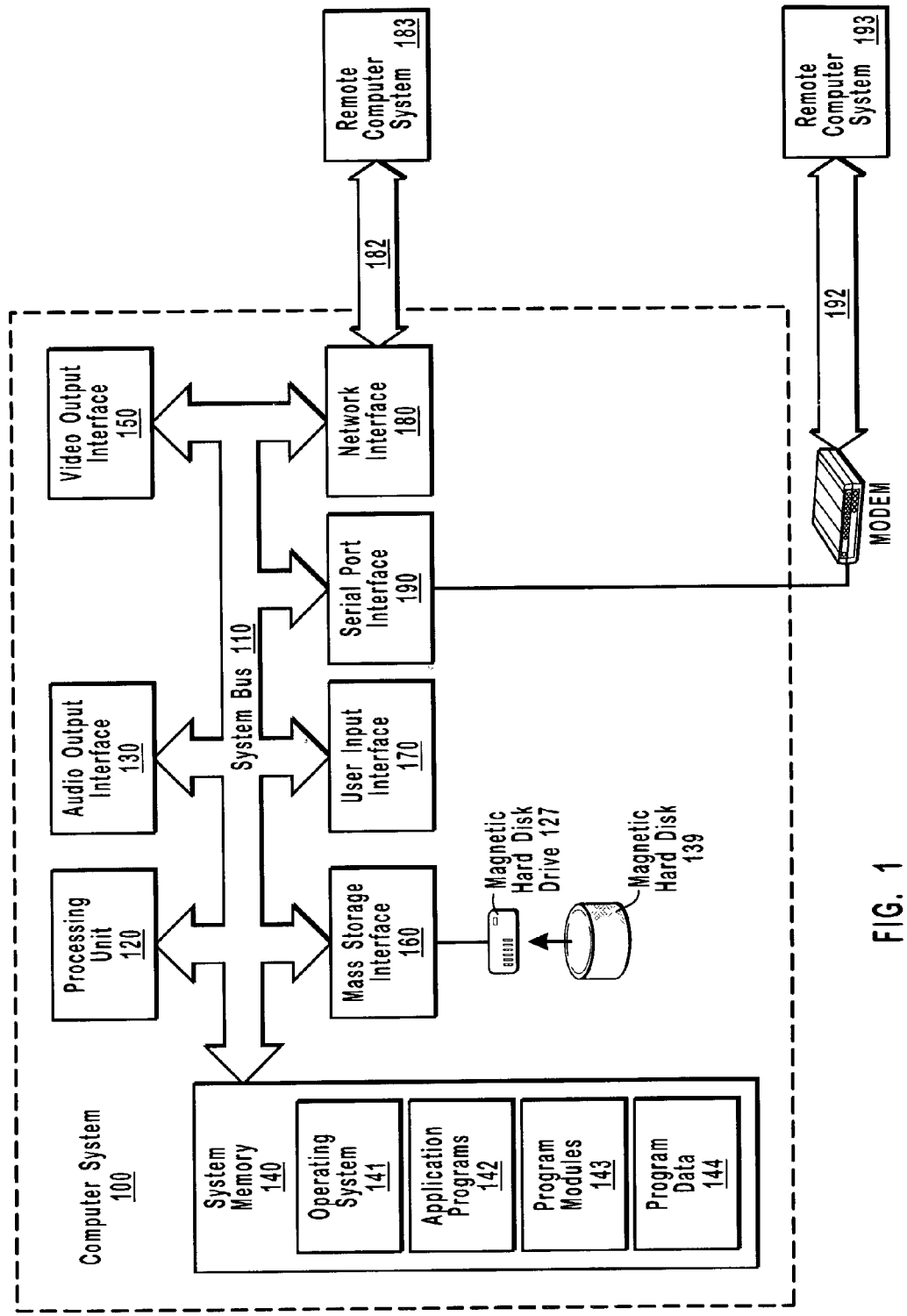
FIG. 1 illustrates an example of a computer system that provides a suitable operating environment for the present invention.

The present invention extends to systems, methods, and computer program products for identifying appropriate undo data during a forward pass through a log. Appropriate undo data can be identified during a roll-forward recovery or as a secondary computer system rolls-forward through log entries received from a primary computer system. A computer system may access a plurality of different locations that store potential undo data, such as, for example, logs, auxiliary storage locations, and computer system objects (e.g., files, database objects, and messages). The principles of the present invention provide for identifying the location, from among the plurality of locations, of appropriate undo data necessary to reverse the effects of an operation that is to be performed at the computer system. When appropriate undo is identified as being stored in a location where the undo data may potentially be lost, the appropriate undo data can be copied to a more secure location.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which an be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as mobile phones or Personal Digital Assistant "PDA") where internal modules (such as a memory and processor) work together to perform operations on electronic data.

In this description and in the following claims, a "logical communication link" is defined as any communication path that may enable the transport of electronic data between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In this description and in the following claims, a "forward pass through a log" is defined as sequentially processing log data from a first more distant point in time in a log to a second more recent point in time in the log. A forward pass through a log is defined to include processing log data between intermediate points in time in a log. For example, if a log contains a plurality of log entries that were written to the log between 5:00 PM and 6:00 PM, a forward pass through the log may include processing only log entries that were written to the log between 5:15 PM to 5:20 PM.

During a forward pass through a log, operations that were previously performed at a computer system can be reconstructed. It may be that the computer system reconstructing previously performed operations is the computer system where the operations were initially performed. For example, as a computer system performs operations (e.g., operations that are part of transactions) the computer system can write log data to a log. If at some time a fault occurs, it may be desirable to return the computer system to a state similar to some previous state before the computer system fault. To achieve this similar state the computer system can perform a roll-forward recovery. As part of the roll-forward recovery, log data in the log can be processed by the computer system to reconstruct operations that were previously performed at the computer system. Reconstructed operations can then be reapplied at the computer system to transition the computer system into the similar state.

However, it may also be that a secondary computer system reconstructs previously performed operations that were initially performed at a primary computer system. For example, as the primary computer system performs operations (e.g., operations that are part of transactions) the primary computer system can write log data to a log. This log can subsequently be shipped from the primary computer system to the secondary computer system (e.g., via a logical communication link). It may be desirable to cause the secondary computer system to transition into a state similar to the primary computer system. To achieve this similar state the secondary computer system can perform a forward pass through the log of the primary computer system. The shipped log can be processed by the secondary computer system to reconstruct operations that were previously performed at the first computer system. Reconstructed operations can then be applied at the secondary computer system to transition the secondary computer system into a state similar to the primary computer system.

In this description and in the following claims, an "object" is defined as any electronic collection of data that can be individually selected and/or manipulated. Object is defined to include files, electronic messages, data streams, and large objects ("LOBs"), such as, for example, portions of sound, video, or graphics.

In this description and in the following claims, a "redo log entry" is defined as a log entry that can be processed by a computer system to reconstruct previously executed user, operation system, and/or application program commands, such as, for example, creating, deleting, or modifying the contents of an object.

In this description and in the following claims, "redo data" is defined as data used by a previously executed user, operating system, and/or application program command to facilitate the intent of the command. For example, when a previously executed command caused an object to be created, redo data may include the name of the created object. Similarly, when a previously executed command caused a portion of a object to be modified (e.g., an edit command), redo data may include the modified portion of the object after the executed command was completed. Thus, redo data can be used during a forward pass through a log, for example, to recreate a created object or to modify an object similarly to how the object was previously modified by an executed command.

In this description and in the following claims, a "undo log entry" is defined as a log entry that can be processed by a computer system to construct commands for reversing the effects of an executed user command, executed operating system command, executed application program command, and/or a reconstructed command caused by processing a redo log entry.

In this description and in the following claims, "undo data" is defined as data used to facilitate the intent of an undo log entry. For example, when an executed command caused an object to be created, undo data may include a delete command used to reverse the effects of the object creation. Similarly, when an executed command caused a portion of an object to be modified (e.g., an edit command), undo data may include the portion of the object before the command was executed. Thus, undo data can be used to return a computer system to a state before a command was executed, such as, for example, returning an object to a state it was in before a modification to the contents of the object occurred.

It should be understood that some log entries can be viewed as both redo log entries and undo log entries. That is, a single log entry can be processed by a computer system to reconstruct previously executed commands and construct commands for reversing the effects of previously executed commands.

In this description and in the following claims, a "fault" is defined as an unexpected failure in a module (either hardware or software) of a computer system. Some faults can cause data at a computer system to be lost. For example, a power failure can cause data stored in Random Access Memory to be lost. Other faults can cause data at a computer system to become corrupted. For example, a malfunctioning head on a magnetic hard disk can result in data being improperly stored.

In the Figures, when a sole period is encountered on two consecutive lines (i.e., a vertical ellipsis) in an auxiliary storage, this represents that other locations may precede or follow the illustrated locations. For example, in FIG. 2, other storage locations may precede location 267 and/or follow location 297. In the Figures, when a vertical ellipsis is encountered in a location of auxiliary storage, this represents that the location may store other data that precedes, follows, or is interspersed with the illustrated data. For example, in FIG. 2, other data may precede undo data 278, be interspersed between undo data 278 and cycle count 273, and/or follow cycle count 279.

In the Figures when two consecutive periods are encountered (i.e., a horizontal ellipsis) in a log, this represents that other log entries may of follow the illustrated log entries. For example, in FIG. 2, other log entries may precede log entry 212 or follow undo log entry 252. In the Figures, when a vertical ellipsis is encountered in a log entry, this represents that the log entry may store other data that precedes, follows, or is interspersed with the illustrated data. For example, in FIG. 2, other data may precede redo data 223, be interspersed between redo data 223 and operation 224, be interspersed between operation 24 and object reference 225, and/or follow object reference 225.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogramming data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules and other data for computer system 100. For example, magnetic hard disk 139 can store one or more program modules including operating system 141, application programs 142, other program modules 143, and program data 144. Although the example environment described herein employs magnetic hard disk 139, other types of computer-readable media (and corresponding drives) for storing data can be used, including removable magnetic disks, optical disks, removable optical disks, magnetic cassettes, flash memory cards, digital versatile disks, Bernoulli cartridges, RAMs, ROMs, and the like.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. Remote computer system 183 can be an electronic messaging server that receives and stores electronic messages for recipients, including recipients that utilize computer system 100 to access electronic messages.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. Remote computer system 193 can be an electronic messaging server that receives and stores electronic messages for recipients, including recipients that utilize computer system 100 to access electronic messages.

Alternatively, computer system 100 can exchange data with external sources through other interfaces, such as, for example, a parallel port, a game port, or a universal serial bus ("USB") port.

It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, log processing modules, as well as associated data, including log, log entries, redo data, undo data, auxiliary storage, auxiliary storage locations, and objects may be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored in the mass storage device.

In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
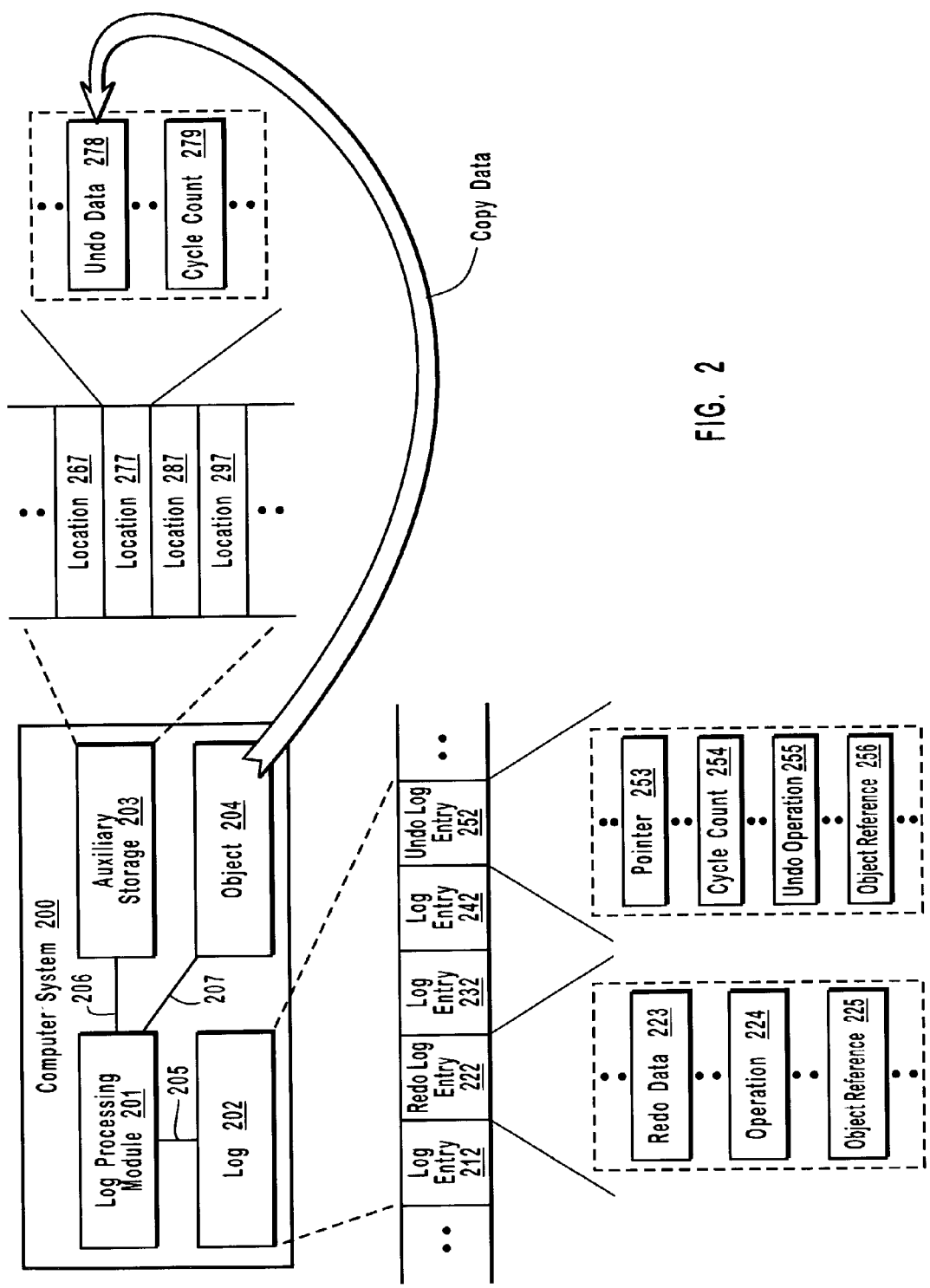
FIG. 2 illustrates an example of some of the functional components that facilitate identifying appropriate undo data during a roll-forward recovery.

FIG. 2 illustrates some of the functional components that can facilitate identifying appropriate undo data during a roll-forward recovery. Illustrated in FIG. 2 is computer system 200, which includes log processing module 201. Log processing module 201 is communicatively coupled to log 202, auxiliary storage 203, and object 204 via corresponding logical communication links 205, 206, and 207. During a forward pass through log 202, log processing module 201 can process log entries (e.g., log entries 212, 222, 232, 242, and 252) to cause computer system 200 to transition into a state that matches a previous state of computer system 200. For example, after a fault, log processing module 201 may process log entries in log 202 as part of a roll-forward recovery to transition computer system 200 into a stat that matches the state of computer system 200 before the fault.

Auxiliary storage 203 can be used to maintain undo data for facilitating the intent of undo log entries in log 202. Undo log entries (e.g., undo log entry 252) in log 202 can include references (e.g., pointer 253) to locations (e.g., location 277) in auxiliary storage 203 where undo data is stored. When it is desirable to reverse the effects of a previously executed command, undo data can be retrieved from auxiliary storage 203.

Figure 4:
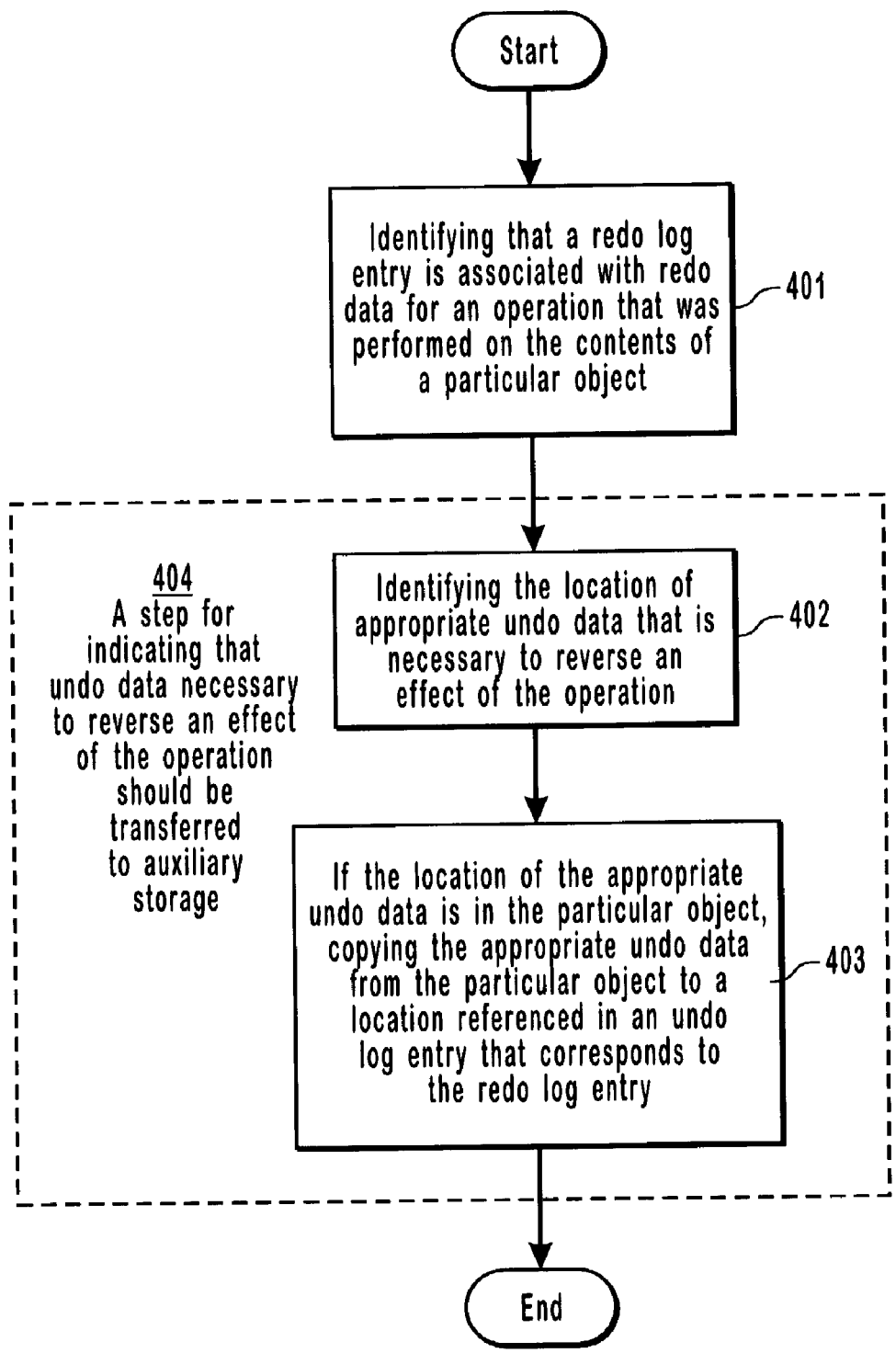
FIG. 4 is a flow diagram illustrating an example of a method for identifying appropriate undo data during a roll-forward recovery.

FIG. 4 is a flow diagram illustrating an example of a method for identifying appropriate undo data during a roll-forward recovery. The method of FIG. 4 will be discussed with reference to the functional components of FIG. 2.

The method of FIG. 4 includes an act of identifying that a redo log entry is associated with redo data for an operation that was performed on the contents of a particular object (act 401). This can include identifying, during a forward pass through log 202, that redo log entry 222 contains redo data 223 for operation 224 that was performed on the contents of object 204. For example, redo log entry 222 may contain redo data for an edit command that is to be performed on object 204. Object reference 225 (e.g., a file identifier or a file name) can be used to indicate that operation 224 was performed on the contents of object 204. The contents of object 204 (and potentially one or more other objects) may be stored at one or more computer-readable media associated with computer system 200.

The method of FIG. 4 includes a functional, result-oriented step for indicating that undo data necessary to reverse an effect of the operation should be transferred to auxiliary storage (step 404). Step 404 may include any corresponding acts for accomplishing the result of indicating that undo data necessary to reverse an effect of the operation should be transferred to auxiliary storage. However, in the illustrated example of FIG. 4, the step 404 includes a corresponding act of identifying the location of appropriate undo data that is necessary to reverse an effect of the operation (act 402).

Undo log entry 252 includes undo operation 255 and object reference 256. Similar to object reference 225, object reference 256 can be used to indicate that undo operation 255 is to be performed on the contents of object 204. It may be that object reference 225 and object reference 256 both reference object 204 using the same object identifier or object name. However, it may also be that object reference 225 and object reference 256 reference object 204 using different object identifiers and/or object names. Further, object reference 225 may reference object 204 with an object identifier and object reference 256 may reference object 204 with an object name or vice versa.

Undo operation 255 can be an operation, that when executed, will reverse an effect of operation 224. For example, if operation 224 is a create file operation, undo operation 255 may be a delete file operation. Pointer 253 can reference undo data (e.g., a portion of the contents of object 204) that is to be used by undo operation 255. When undo operation 255 is an operation for reversing an effect of a modification to the contents of object 204, pointer 253 can reference a location (e.g., location 277) of auxiliary storage 203 that contains a portion of the contents of object 204 before modification by operation 204.

In some environments, undo log entries and undo data are flushed from memory (e.g., system memory 140) to persistent storage (e.g., magnetic hard disk 139) at different times. If a fault occurs after an undo log entry has been flushed but before corresponding undo data has been flushed, or vice versa, data inconsistencies may result during a subsequent forward pass through a log. To reduce the likelihood of inconsistencies, when an undo log entry is flushed from memory to a log, a cycle count, such as, for example, cycle count 254, can be associated with the undo log entry. Similarly, when undo data corresponding to an undo log entry is flushed from memory to auxiliary storage, a cycle count, such as, for example, cycle count 279, can be associated with the undo data. A cycle count can be represented using virtually any data type including logical, binary, octal, decimal, hexadecimal, character, character string, user-defined data types, or data structures. Likewise, a cycle count value can be set to virtually any value including, a numeric value (e.g., 9, FE, 10010, etc.), a character of text (e.g., "a", "f", "7", etc.), a string of text (e.g., "test", "count=FC", etc.), or user-defined values.

It may be that a computer system attempts to associate the same cycle count with both an undo log entry and a corresponding location in the auxiliary storage. For example, when pointer 253 references location 277, log processing module 201 may attempt to set cycle count 254 and cycle count 279 to the same value. If computer system 200 is functioning at the time undo log 252 is flushed from memory to persistent storage and at the time undo data 278 is flushed from memory to persistent storage, cycle count 254 and cycle count 279 may indeed be set to the same value. However, if a fault occurs after undo log entry 252 is flushed but before undo data 278 is flushed, cycle count 254 and cycle count 279 can have different values. Computer system 200 may set cycle count 254 to a first value but because of the fault may be unable to also set cycle count 279 to the first value. Thus, cycle count 279 may remain at a previously set value or an initialization value.

When computer system 200 successfully set cycle count 254 and cycle count 279 to the same value, the value may then be modified according to user-defined rules. For example, if cycle count values are numeric values the value can be incremented (e.g., by adding one to the current numeric value). Thus, cycle counts of a subsequent undo log entry and corresponding location in auxiliary storage can be set a value that differs from the values of cycle count 254 and cycle count 279. As a result, there is an increased likelihood it can be determined when undo data stored in a location of auxiliary storage 203 is appropriate undo data.

During a forward pass through a log, a cycle count value associated with an undo log entry can be compared to a cycle count value associated with a corresponding location in auxiliary storage. When the cycle count values match this can indicate that an undo log entry and corresponding undo data were flushed in a consistent manner (e.g., a fault did not occur between flushing the undo log entry and flushing the undo data). Thus, there is an increased chance that the location in auxiliary storage contains the appropriate undo data. However, when the cycle counts do not match, this can indicate that an undo log entry and corresponding data were flushed in an inconsistent manner (e.g., a fault occurred between flushing the undo log entry and flushing the undo data). Thus, there is a decreased chance that the location in auxiliary storage contains the appropriate undo data. Further, when cycle counts do not match, this may be an indication that appropriate undo data is still in the object (e.g., in object 204). Alternatively, when cycle counts differ, this may be an indication that there is no appropriate undo data.

Cycle count values are viewed as matching according to user-defined conditions. If numeric cycle count values or character cycle count values are used, it may be that a first cycle count value and a second cycle count value are viewed as matching when they are equal. For example, if cycle count 254 had a value of 7 and cycle count 279 had a value of 7, cycle count 254 and cycle count 279 can be viewed as matching cycle count values. Likewise, if cycle count 254 had a value of "c" and cycle count 279 had a value of "c", cycle count 254 and cycle count 279 can be viewed as matching cycle count values. However, when using character strings values, values for user-defined data types, or data structure values, other user-defined conditions can be utilized to determine a match. For example, when using character strings a match may result when an appropriate portion of string values are equal.

When the location of appropriate undo data is identified as being in an object, the appropriate undo data can be copied from the object. In the illustrated example of FIG. 4, step 404 also includes a corresponding act of copying the appropriate undo data from the particular object to a location referenced in an undo log entry that corresponds to the redo log entry (act 403). For example, appropriate undo data may be copied if the appropriate undo data is in the particular object and performing the operation associated with the redo data could result in potential loss of the appropriate undo data from the particular object. Appropriate undo data can be copied from a portion of object 204 to undo data 278 when it is indicated that performance of operation 224 would overwrite the portion of object 204. The arrow labeled "copy data" in FIG. 2 indicates that a portion of the contents of object 204 is copied to undo data 278.

During a forward pass through log 202 redo log entry 222 may be processed to reconstruct operation 224 for modifying the contents of object 204. However, some of the contents that will be modified by operation 224 may be appropriate undo data necessary to reverse an effect of operation 224. To preserve the appropriate undo data it may be copied to undo data 278. After copying the appropriate undo data, operation 224 may be applied. Thus, if undo log entry 252 is subsequently processed to reverse an effect of operation 224, pointer 253 will now reference the appropriate undo data (i.e., undo data 278).

By using a cycle count there is an increased chance that the appropriate location of undo can be identified. This in turn increases the chances of being able to transition a computer system into a state that matches a prior state of the computer system.

Further, once computer system 200 is in a matching state, undo data from auxiliary storage 203 can be used to undo changes associated with aborted transactions thereby transitioning computer system 200 into a consistent state. Undoing changes associated with aborted transactions can be facilitated by compensation log records, which are redo log records used to unwind changes to objects when a transaction aborts. Undoing changes associated with aborted transactions can be included as part of a recovery to move computer system 200 back to a previous consistent state by aborting uncommitted transactions.

Figure 3:
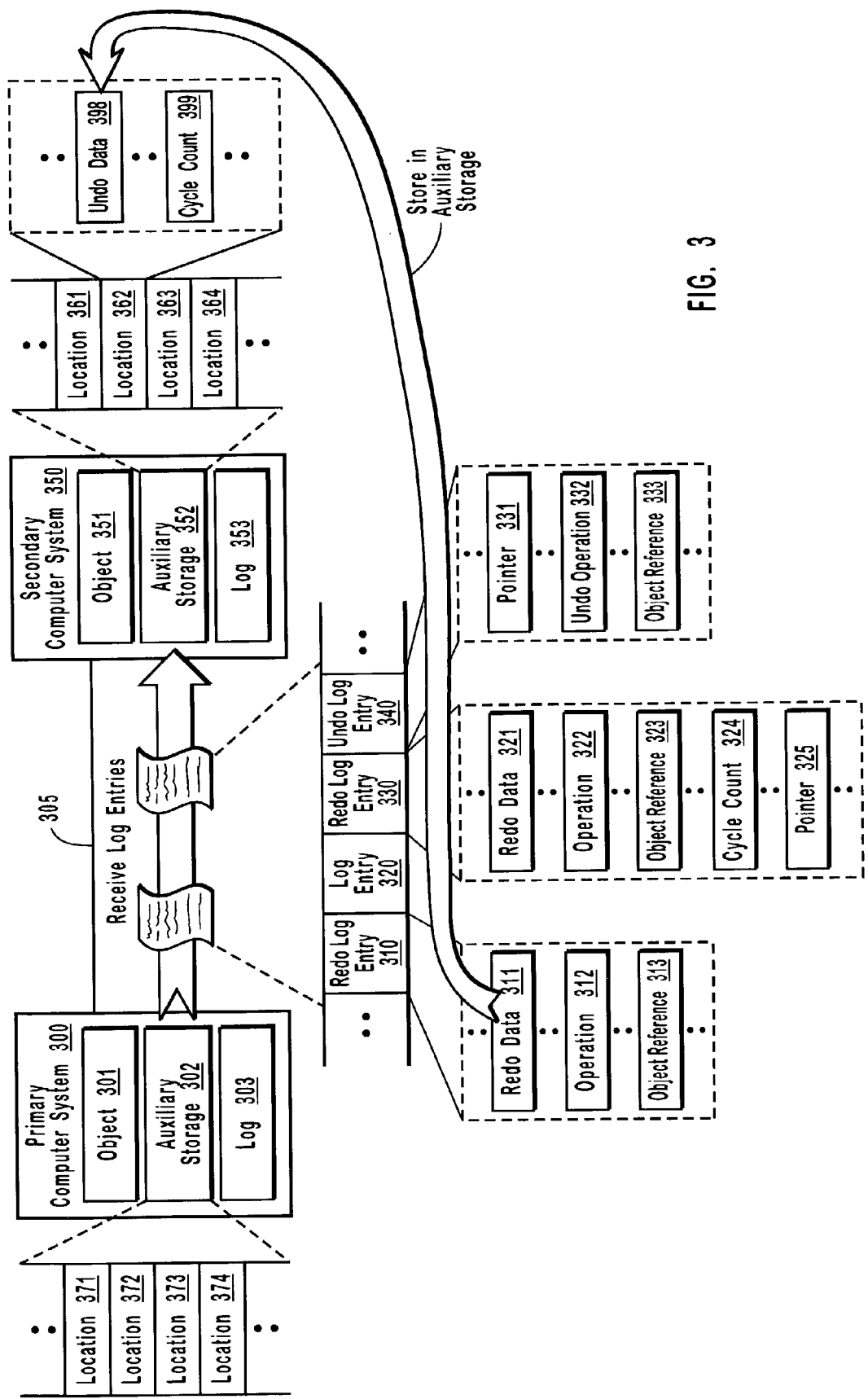
FIG. 3 illustrates an example of some of the functional components that facilitate rolling-forward through log entries from a primary computer system to identify appropriate undo data at a secondary computer system.

FIG. 3 illustrates an example of some of the functional components that facilitate rolling-forward through log entries from a primary computer system to identify appropriate undo data at a secondary computer system. Illustrated in FIG. 3 are primary computer system 300 and secondary computer system 350. Primary computer system 300 includes object 301, auxiliary storage 302, and log 303. Log 303 can contain a plurality of log entries, some of which can be redo log entries and some of which can be undo log entries. Redo log entries in log 303 can be processed to reconstruct commands that were performed at primary computer system 300, including commands that modified the contents of object 301. Undo log entries in log 303 can be processed to reverse the effects of commands performed at primary computer system 300, including commands that modified the contents of objects 301. Locations in auxiliary storage 302, such as, for example, location 372, can store undo data referenced by the undo log entries of log 303. Log entries from log 303 may at specified times and/or as a result of the occurrence of an event be shipped from primary computer system 300 to secondary computer system 351 via logical communication link 305.

Secondary computer system 350 includes object 351, auxiliary storage 352, and log 353. Log 353 can contain log entries from log 303 that were shipped to secondary computer system 350. Thus, similar to log 303, log 353 can contain some redo log entries and some undo log entries. Redo log entries in log 353 can be processed to reconstruct commands that were performed at primary computer system 300, including commands that modified the contents of object 301. However, secondary computer system 351 may apply these reconstructed commands to modify the contents of object 351.

Similarly, undo log entries in log 353 can be processed to reconstruct other commands to reverse the effects of commands performed at primary computer system 300, including commands that reversed the effects of modifications to the contents of object 301. However, secondary computer system 351 may apply these reconstructed other commands to reverse the effects of commands that modified the contents of object 351. Thus, secondary computer system 351 can process the log entries of lo 303 to transition into a state that matches primary computer system 300.

It may be that secondary computer system 350 is initialized to a configuration that is substantially similar to primary computer system 300. This can include copying the contents of any mass storage devices at primary computer system 300 to corresponding mass storage devices at secondary computer system 350. For example, an exact image of the contents of any mass storage devices at primary computer system 300 can be taken (commonly referred to as a "snapshot") and copied to corresponding mass storage devices at secondary computer system 350. This can include copying the contents of auxiliary storage 302 to auxiliary storage 352. Secondary computer system 350 can be initialized before and/or during the reception of log entries from primary computer system 300.

Figure 5:
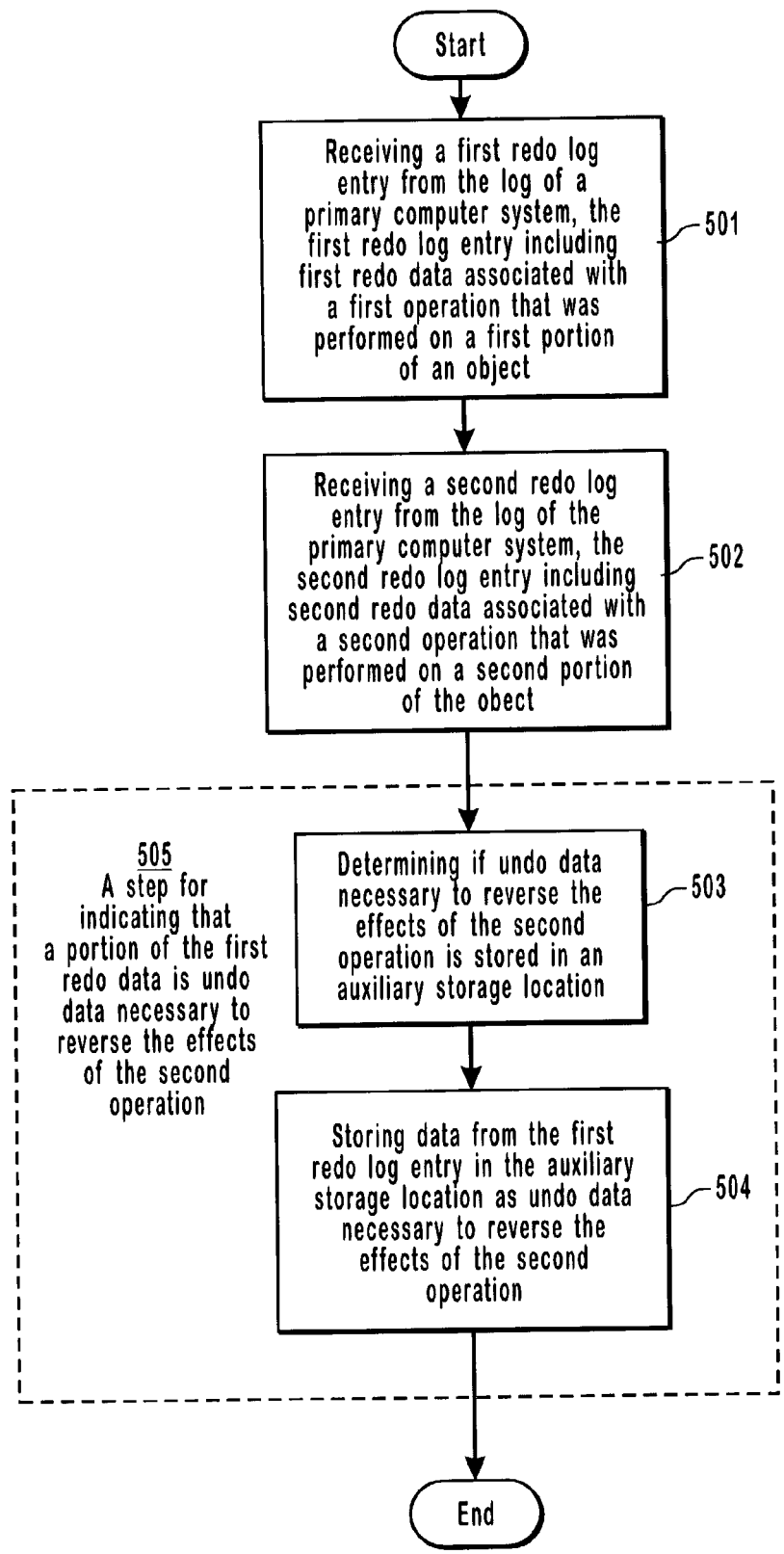
FIG. 5 is a flow diagram illustrating an example of a method for rolling-forward through log entries from a primary computer system to identify appropriate undo data at a secondary computer system.

FIG. 5 is a flow diagram illustrating an example of a method for rolling-forward through log entries from a primary computer system to identify appropriate undo data for a secondary computer system. The method of FIG. 5 will be discussed with reference to the functional components of FIG. 3.

The method in FIG. 5 includes an act of receiving a first redo log entry from the log of a primary computer system (act 501). As illustrated in FIG. 3 by the arrow labeled "Receive Log Entries," secondary computer system 350 receives log entries from primary computer system 300. For example, secondary computer system 350 may receive redo log entry 310 from primary computer system 300. The first redo entry can include first redo data associated with a first operation that was performed on a first portion of an object. For example, redo log entry 310 can include redo data 311 used by operation 312 to modify a first portion of the contents of object 351 (as reference by object reference 313) at the secondary computer system 350 (or a first portion of the contents of object 301 at primary computer system 300).

The method in FIG. 5 includes an act of receiving a second redo log entry from the log of a primary computer system (act 502). For example, secondary computer system 350 may receive redo log entry 330 from primary computer system 300. The second redo entry can include second redo data associated with a second operation that was performed on a second portion of the object. For example, redo log entry 330 can include redo data 321 used by operation 322 to modify a second portion of the contents of object 351 (as reference by object reference 323) at secondary computer system 350 (or a second portion of the contents of object 301 at primary computer system).

The method in FIG. 5 includes a functional, result-oriented step for indicating that a portion of the first redo data is undo data necessary to reverse the effects of the second operation (step 505). Step 505 may include any corresponding acts for accomplishing the result of indicating that a portion of the first redo data is undo data necessary to reverse the effects of the second operation. However, in the illustrated example of FIG. 5, the step 505 includes a corresponding act of determining if undo data necessary to reverse the effects of the second operation are stored in an auxiliary storage location (act 503).

This can include determining checking a location in auxiliary storage 352. When redo log 330 is received at secondary computer system 350, secondary computer system 350 can access a location in auxiliary storage that is pointed to by pointer 325, such as, for example, location 362. Secondary computer system 350 can compare cycle count 324 to cycle count 399 to determine if undo data 398 is correct undo data. When cycle count 324 and cycle count 399 match, undo data 398 can be determined to be the correct undo data. On the other hand, when cycle count 324 and cycle count 399 do not match, undo data 398 is determined to be incorrect undo data.

In the illustrated example of FIG. 5, the step 505 also includes a corresponding act of storing data from the first redo log entry in the auxiliary storage location as undo data necessary to reverse the effects of the second operation (act 504). Data from the first redo log entry can be, for example, redo data 311. As illustrated by the arrow labeled "Store in Auxiliary Storage," this can include storing a portion of redo data 311 in undo data 398. Location 362 can also be the location referenced by pointer 331. Thus, undo data 398 can be used when performing undo operation 332 to reverse the effects of operation 322. For example, if object references 323 and 333 both reference file 351, undo operation 332 can access undo data 398 to reverse the effect of operation 322 being performed on object 351.

Since undo data can be identified at the secondary computer system, there is little need to separately transfer the undo data across network connections to the secondary computer system. This can reduce the bandwidth requirements for transferring log data from a primary computer system to a secondary computer system by as much as 50%.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system comprising a processor and one or more physical storage media, wherein the computer system also includes a log with a plurality of log entries, wherein a log entry may be a redo log entry, which includes redo data for recreating an operation the was performed on the content of an object, or a log entry may be an undo log entry, which references undo data necessary to reverse an effect of an operation that was performed on the contents of an object, wherein a reference to undo data can be a reference to a location at an auxiliary storage, a method for determining appropriate undo data to associate with a particular object during a roll-forward recovery so as to cause the auxiliary storage to be consistent with the log, the method comprising:
    an act of identifying that a redo log entry includes redo data associated with an operation that was performed on the contents of the particular object;
    an act of identifying the location of appropriate undo data that is necessary to reverse an effect of the operation associated with the redo data; and
    if the location of the appropriate undo data is in the particular object, and performing the operation associated with the redo data would result in potential loss of the appropriate undo data from the particular object, an act of copying the appropriate undo data from the particular object to a location referenced in an undo log entry that corresponds the redo log entry.

2. The method as recited in claim 1, wherein the identifying that a redo log entry includes redo data associated with an operation that was performed on the contents of the particular object comprises the following:
    an act of identifying that a redo log entry includes redo data associated with an operation that modified the contents of the particular object.

3. The method as recited in claim 1, wherein the identifying that a redo log entry includes redo data associated with an operation that was performed on the contents of the particular object comprises the following:
    an act of identifying that a redo log entry includes redo data associated with an operation that was performed on the contents of a object identified by an object reference contained in the redo log entry.

4. The method as recited in claim 1, wherein the identifying that a redo log entry includes redo data associated with an operation that was performed on the contents of the particular object comprises the following:
    an act of identifying that a redo log entry includes data that is to be inserted into the particular object when the redo log entry is processed.

5. The method as recited in claim 1, wherein the identifying that a redo log entry includes redo data associated with an operation that was performed on the contents of the particular object comprises the following:
    an act of identifying during a forward pass through the log that a redo log entry includes redo data associated with an operation that was performed on the contents of the particular object.

6. The method as recited in claim 1, wherein the identifying that a redo log entry includes redo data associated with an operation that was performed on the contents of the particular object comprises the following:
    an act of identifying a redo log entry that can be processed to recreate the operation that was performed on the contents of the particular object.

7. The method as recited in claim 1, wherein the identifying that a redo log entry includes redo data associated with an operation that was performed on the contents of the particular object comprises the following:
    an act of identifying a redo log entry that can be processed to recreate the operation that was performed on the contents of a file.

8. The method as recited in claim 1, wherein the act of identifying the location of appropriate undo data that is necessary to reverse an effect of the operation associated with the redo data comprises the following:
    an act of determining if a first cycle count value associated with an undo log entry matches a second cycle count value associated with a location at the auxiliary storage.

9. The method as recited in claim 1, wherein the act of identifying the location of appropriate undo data that is necessary to reverse an effect of the operation associated with the redo data comprises the following:
    an act of identifying that the location of the appropriate undo data is a location in auxiliary storage.

10. The method as recited in claim 1, wherein the act of identifying the location of appropriate undo data that is necessary to reverse an effect of the operation associated with the redo data comprises the following:
    an act of identifying that the location of the appropriate undo data is in the particular object.

11. The method as recited in claim 1, wherein the act of identifying the location of appropriate undo data that is necessary to reverse an effect of the operation associated with the redo data comprises the following:
    an act of identifying that there is no appropriate undo data.

12. The method as recited in claim 1, wherein the act of copying the appropriate undo data from the particular object to a location referenced in an undo log entry that corresponds the redo log entry comprises the following:
    an act of copying the appropriate undo data from the particular object to a location in auxiliary storage.

13. The method as recited in claim 1, wherein the act of copying the appropriate undo data from the particular object to a location referenced in an undo log entry that corresponds the redo log entry comprises the following:
    an act of copying the appropriate undo data from the particular object to a location referenced by a pointer included in the undo log entry.

14. The method as recited in claim 1, wherein the act of copying the appropriate undo data from the particular object to a location referenced in an undo log entry that corresponds the redo log entry comprises the following:

an act of copying the appropriate undo data from the particular object to a location referenced in an undo log entry such that the undo log entry can be processed to create an undo operation for reversing an effect of the operation that was performed on the contents of the particular object.

15. The method as recited in claim 1, wherein the act of copying the appropriate undo data from the particular object to a location referenced in an undo log entry that corresponds the redo log entry comprises the following:

an act of copying the appropriate undo data from a file to a location referenced in an undo log entry.

16. The method as recited in claim 1, wherein the act of copying the appropriate undo data from the particular object to a location referenced in an undo log entry that corresponds the redo log entry comprises the following:

an act of copying the appropriate undo data from a first location on a computer-readable medium to a second location on the computer-readable medium.

17. The method as recited in claim 1, wherein the act of copying the appropriate undo data from the particular object to a location referenced in an undo log entry that corresponds the redo log entry comprises the following:

an act of copying the appropriate undo data from a first computer-readable medium to a second computer-readable medium.

18. The method as recited in claim 1, further comprising:

an act of processing the redo log entry to recreate the operation that was performed on the contents of the particular object.

19. The method as recited in claim 18, further comprising:

an act of, subsequent to copying the appropriate undo data to the location referenced in the undo log entry, applying the recreated operation to overwrite the portion of the particular object that was copied to the location referenced in the undo log entry.

20. In a computer system comprising a processor and one or more physical storage media, wherein the computer system also includes a log with a plurality of log entries, wherein a log entry may be a redo log entry, which includes redo data necessary to recreate an operation the was performed on the contents of an object, or a log entry may be an undo log entry, which references undo data necessary to reverse an effect of an operation that was performed on the contents of an object, wherein a reference to undo that can be a reference to a location at an auxiliary storage, a method for determining appropriate undo data to associate with a particular object during a roll-forward recovery so as to cause the auxiliary storage to be consistent with the log, the method comprising:

an act of identifying that a redo log entry includes redo data associated with an operation that was performed on the contents of the particular object; and a step for indicating that undo data necessary to reverse an effect of the operation that was performed on the contents of the particular object should be transferred to auxiliary storage so as to reduce the chance of overwriting the undo data.

21. In a secondary computer system comprising a processor and one or more physical storage media, wherein the secondary computer system that rolls-forward through log entries from the log of primary computer system in order to transition into a state similar to the primary computer system, wherein the secondary computer system includes a secondary auxiliary storage that can store undo data necessary to reverse the effects of operations that are performed at the secondary computer system, a method for causing the secondary auxiliary storage to transition into a state that matches a primary auxiliary storage at the primary computer system, the method comprising:

an act of receiving a first redo entry from the log of the primary computer system, the first redo entry including first redo data associated with a first operation that was performed on a first portion of an object;

an act of, subsequent to receiving the first redo entry, receiving a second redo entry from the log of the primary computer system, the second redo entry including second redo data associated with an second operation that was performed on a second portion of the object;

an act of determining if undo data necessary to reverse the effects of the second operation is stored in the secondary auxiliary storage location; and an act of storing data from the first redo log entry in the secondary auxiliary storage location as undo data necessary to reverse the effects of the second operation.

22. The method as recited in claim 21, wherein the act of receiving a first redo entry from the log of the primary computer system comprises the following:

an act of receiving a first redo entry that can be processed to recreate an operation that was performed at the primary computer system.

23. The method as recited in claim 21, wherein the act of receiving a first redo entry from the log of the primary computer system comprises the following:

an act of receiving a first redo entry that includes first redo data for modifying a first portion of an object at the secondary computer system.

24. The method as recited in claim 23, wherein the act of receiving a first redo entry that includes first redo data for modifying a first portion of an object at the secondary computer system comprises the following:

an act of receiving a first redo entry that includes first redo data for modifying a first portion of a file at the secondary computer system.

25. The method as recited in claim 21, wherein the act of receiving a second redo entry from the log of the primary computer system comprises the following:

an act of receiving a second redo entry that can be processed to recreate an operation that was performed at the primary computer system.

26. The method as recited in claim 21, wherein the act of receiving a second redo entry from the log of the primary computer system comprises the following:

an act of receiving a second redo entry that includes second redo data for modifying a second portion of the object at the secondary computer system.

27. The method as recited in claim 26, wherein the act of receiving a second redo entry that includes second redo data for modifying a second portion of the object at the secondary computer system comprises the following:

an act of receiving a second redo entry that includes second redo data for modifying a second portion of a file at the secondary computer system.

28. The method as recited in claim 21, wherein the act of determining if undo data necessary to reverse the effects of the second operation is stored in an auxiliary storage location comprises the following:

an act of determining if a cycle count included in the second redo log entry matches a cycle count in the secondary auxiliary storage location.

29. The method as recited in claim 21, wherein the act of determining if undo data necessary to reverse the effects of the second operation is stored in an auxiliary storage location comprises the following:
   an act of determining if applying the second operation would overwrite part of the contents of the object that were modified by the first operation.

30. The method as recited in claim 21, wherein the act of storing data from the first redo log entry in the secondary auxiliary storage location comprises the following:
   an act of copying data from the first redo log entry to the secondary auxiliary storage.

31. The method as recited in claim 21, wherein the act of storing data from the first redo log entry in the secondary auxiliary storage location comprises the following:
   an act of transferring data, which was inserted into the object when the first operation was applied at the secondary computer system, from the object to the secondary auxiliary storage.

32. The method as recited in claim 21, wherein the act of storing data from the first redo log entry in the secondary auxiliary storage location comprises the following:
   act of storing data from the first redo log entry at location referenced by a pointer included in the second redo log entry.

33. The method as recited in claim 21, further comprising:
   an act of using the undo data stored in the auxiliary storage location, to reverse an effect of the second operation being performed at the secondary computer system.

34. The method as recited in claim 21, further comprising:
   an act of receiving a snapshot of the primary computer system to initially transition the state of the secondary auxiliary storage into a state similar to the state of the primary auxiliary storage.

35. In a secondary computer system comprising a processor and one or more physical storage media, wherein the secondary computer system that rolls-forward through log entries from the log of primary computer system in order to transition into a state similar to the primary computer system, wherein the secondary computer system includes a secondary auxiliary storage that can store undo data necessary to reverse the effects of operations that are performed at the secondary computer system, a method for causing the secondary auxiliary storage to transition into a state that matches a primary auxiliary storage at the primary computer system, the method comprising:
   an act of receiving a first redo entry from the log of the primary computer system, the first redo entry including first redo data associated with a first operation that was performed on a first portion of an object;
   an act of, subsequent to receiving the first redo entry, receiving a second redo entry from the log of the primary computer system, the second redo entry including second redo data associated with an second operation that was performed on a second portion of the object; and
   a step for indicating that a portion of the first redo data is undo data necessary to reverse an effect of the second operation so as to reduce the bandwidth needed to transfer appropriate undo data from the primary computer system to the secondary computer system.

36. A computer program product for use in a computer system that includes a log with a plurality of log entries, wherein a log entry may be a redo log entry, which includes redo data for recreating an operation the was performed on the contents of an object, or a log entry may be an undo log entry, which references undo data necessary to reverse an effect of an operation that was performed on the contents of an object, wherein a reference to undo data can be a reference to a location at an auxiliary storage, the computer program product for implementing a method for determining appropriate undo data to associate with a particular object during a roll-forward recovery so as to cause the auxiliary storage to be consistent with the log, the computer program product comprising:
   one or more computer-readable media that include physical storage media carrying computer-executable instructions, that when executed at the computer system, cause the computer-system-to perform the method, including:
   identifying that a redo log entry includes redo data associated with an operation that was performed on the contents of the particular object;
   identifying the location of appropriate undo data that is necessary to reverse the effect of the operation associated with the redo data; and
   if the location of the appropriate undo data is in the particular object, and performing the operation associate with the redo data would result in potential loss of the appropriate undo data form the particular object, copying the appropriate undo data from the particular object to a location referenced in an undo log entry that corresponds the redo log entry.

37. The computer program product as recited claim 36, wherein the one or more computer-readable media include system memory.

38. A computer program product for use in a secondary computer system that rolls-forward through log entries from the log of primary computer system in order to transition into a state similar to the primary computer system, wherein the secondary computer system includes a secondary auxiliary storage that can store undo data necessary to reverse the effects of operations that are performed at the secondary computer system, the computer program product for implementing a method for causing the secondary auxiliary storage to transition into a state that matches a primary auxiliary storage at the primary computer system, the computer program product comprising:
   one or more computer-readable media that include physical storage media carrying computer-executable instructions, that when executed at the secondary computer system, cause the secondary computer system to perform the method, including:
   receiving a first redo entry from the log of the primary computer system, the first redo entry including first redo data associated with a first operation that was performed on a first portion of an object;
   subsequent to receiving the first redo entry, receiving a second redo entry from the log of the primary computer system, the second redo entry including second redo data associated with an second operation that was performed on second portion of the object;
   determining if undo data necessary to reverse the effects of the second operation is stored in the secondary auxiliary storage location; and
   storing data from the first redo log entry in the secondary auxiliary storage as undo data necessary to reverse the effects of the second operation being performed at the secondary computer system.

39. The computer program product as recited claim 38, wherein the one or more computer-readable media include system memory.

40. A computer system, comprising:
one or more processors;
system memory; and
one or more computer-readable media having stored thereon one or more objects, a log containing log entries, an auxiliary storage containing undo data, and computer-executable instructions that, when executed by the one or more processors, cause the computer system to roll-forward through the log, including:
  identifying that a redo log entry includes redo data associated with an operation that was performed on the contents of a particular object stored on the one or more computer-readable media;
  identifying the location, on the one or more computer-readable media, of appropriate undo data that is necessary to reverse the effect of the operation associated with the redo data; and
  if the identified location is a location where a portion of the particular object is stored, copying the appropriate undo data from the identified location to a location on the one or more computer readable-media, as referenced in an undo log entry associated with the redo log entry, which has been allocated to the auxiliary storage.

41. A network system comprising:
a primary computer system including one or more processors, system memory, and one or more computer-readable media, the primary computer system being configured to:
  generate log entries for operations that are performed on the contents of objects accessed by the primary computer systems;
  store redo data for performed operations in log entries;
  store undo data for performed operations in a primary auxiliary storage; and
  send log entries to at least one secondary computer system; and
a secondary computer system that is network connectable to the primary computer system, the secondary computer system including one or more processors, system memory, and one or more computer-readable media, the secondary computer system being configured to:
  receive log entries from the primary computer system;
  roll-forward through received log entries to recreate operations that were performed at the primary computer system; and
  establish consistency between the primary auxiliary storage and a secondary auxiliary storage by storing portions of redo data included in received log entries in the secondary auxiliary storage as undo data.

* * * * *

UNITED STATES PATENT AND TRADEMARK OFFICE
CERTIFICATE OF CORRECTION

PATENT NO.       : 7,036,044 B1
APPLICATION NO.  : 10/295131
DATED            : April 25, 2006
INVENTOR(S)      : Surendra Verma et al.

It is certified that error appears in the above-identified patent and that said Letters Patent is hereby corrected as shown below:

On the Title page, in field (54), in "Title", in column 1, line 1, after "UNDO" insert -- DATA --.

On the Title page, in field (57), in "Abstract", in column 2, line 14, after "copied" insert -- to --.

In column 1, line 1, after "UNDO" insert -- DATA --.

In column 1, line 4, below "LOG" insert -- Related Applications --.

In column 1, line 20, delete "computers" and insert -- computer --, therefor.

In column 1, line 23, after "scheduling" insert -- , --.

In column 1, line 28, delete "queing" and insert -- queuing --, therefor.

In column 2, line 32, delete "complete" and insert -- completed --, therefor.

In column 2, line 59, after "deletion" insert -- operation --.

In column 3, line 2, delete "film" and insert -- file --, therefor.

In column 3, line 62, delete "inconveniences" and insert -- inconvenience --, therefor.

In column 4, line 2, after "would" insert -- also --.

In column 5, line 36, delete "operation" and insert -- operations --, therefor.

In column 5, line 38, delete "includes" and insert -- included --, therefor.

In column 6, line 53, after "which" delete "an" and insert -- can --, therefor.

In column 7, line 17, after "as" insert -- a --.

In column 7, line 17, delete "phones" and insert -- phone --, therefor.

In column 8, line 28, delete "operation" and insert -- operating --, therefor.

CERTIFICATE OF CORRECTION (continued)
U.S. Pat. No. 7,036,044 B1

In column 8, line 38, after "portion of" delete "a" and insert -- an --, therefor.

In column 9, line 35, after "operation" delete "24" and insert -- 224 --, therefor.

In column 10, line(s) 15-16, delete "preprogramming" and insert -- preprogrammed --, therefor.

In column 11, line 56, after "including" delete "log" and insert -- logs --, therefor.

In column 12, line 22, delete "stat" and insert -- state --, therefor.

In column 12, line 37, after "method" delete "of" and insert -- in --, therefor.

In column 12, line 48, delete "objects )" and insert -- objects) --, therefor.

In column 12, line 51, after "method" delete "of" and insert -- in --, therefor.

In column 13, line 17, after "operation" delete "204" and insert -- 224 --, therefor.

In column 13, line 57, delete "set" and insert -- sets --, therefor.

In column 15, line 30, delete "objects" and insert -- object --, therefor.

In column 15, line 56, after "entries of" delete "lo" and insert -- log --, therefor.

In column 16, line 22, delete "reference" and insert -- referenced --, therefor.

In column 16, line 34, delete "reference" and insert -- referenced --, therefor.

In column 17, line 28, in Claim 1, after "operation" delete "the" and insert -- that --, therefor.

In column 17, line 29, in Claim 1, delete "content" and insert -- contents --, therefor.

In column 19, line 43, in Claim 20, after "operation" delete "the" and insert -- that --, therefor.

In column 19, line 47, in Claim 20, after "undo" delete "that" and insert -- data --, therefor.

In column 21, line 66, in Claim 36, after "operation" delete "the" and insert -- that --, therefor.

In column 22, line 13, in Claim 36, delete "computer-system-to" and insert -- computer system to --, therefor.

CERTIFICATE OF CORRECTION (continued)
U.S. Pat. No. 7,036,044 B1

In column 22, line(s) 22-23, in Claim 36, delete "associate" and insert -- associated --, therefor.

In column 22, line 24, in Claim 36, after "data" delete "form" and insert -- from --, therefor.

In column 22, line 28, in Claim 37, after "recited" insert -- in --.

In column 22, line 65, in Claim 39, after "recited" insert -- in --.

In column 23, line(s) 21-22, in Claim 40, delete "computer readable-media" and insert -- computer-readable media --, therefor.

In column 24, line 5, in Claim 41, delete "systems" and insert -- system --, therefor.

Signed and Sealed this

Sixth Day of April, 2010

David J. Kappos
*Director of the United States Patent and Trademark Office*